US008737263B2

(12) United States Patent
Cho et al.

(10) Patent No.: US 8,737,263 B2
(45) Date of Patent: May 27, 2014

(54) APPARATUS AND METHOD FOR ASSIGNING PCI OF HOME BASE STATION

(75) Inventors: Eun Seon Cho, Daejeon (KR); Chan Yong Lee, Daejeon (KR); Hong Soog Kim, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 567 days.

(21) Appl. No.: 12/852,908

(22) Filed: Aug. 9, 2010

(65) Prior Publication Data

US 2011/0038279 A1 Feb. 17, 2011

(30) Foreign Application Priority Data

Aug. 17, 2009 (KR) .................. 10-2009-0075639

(51) Int. Cl.
*H04L 12/28* (2006.01)
*H04W 4/00* (2009.01)
(52) U.S. Cl.
USPC ....................................... 370/254; 370/328
(58) Field of Classification Search
USPC .......... 370/254, 255, 328; 455/444, 446, 443, 455/456.1
See application file for complete search history.

(56) References Cited

U.S. PATENT DOCUMENTS

| 2005/0256903 | A1 | 11/2005 | Van De Sluis et al. |
| 2008/0220779 | A1 | 9/2008 | Bose |
| 2009/0092122 | A1 | 4/2009 | Czaja et al. |
| 2010/0020710 | A1* | 1/2010 | Gupta et al. ................. 370/252 |
| 2010/0331025 | A1* | 12/2010 | Kallin et al. ................. 455/500 |
| 2011/0243097 | A1* | 10/2011 | Lindqvist et al. ............ 370/331 |
| 2012/0172032 | A1* | 7/2012 | Mueck et al. ............. 455/422.1 |

FOREIGN PATENT DOCUMENTS

KR 1020090037636 4/2009

OTHER PUBLICATIONS

Lee, Poongup et al., "Dynamic Reservation Scheme of Physical Cell Identity for 3GPP LTE Femtocell Systems," Journal of Information Processing Systems, vol. 5(4):207-220 (2009).

* cited by examiner

*Primary Examiner* — Hassan Phillips
*Assistant Examiner* — Saba Tsegaye
(74) *Attorney, Agent, or Firm* — Nelson Mullins Riley & Scarborough LLP; Anthony A. Laurentano, Esq.; John S. Curran, Esq.

(57) ABSTRACT

An apparatus and method for assigning a Physical Cell Identity (PCI) of a Home eNodeB (HeNB) are provided. The apparatus may distribute PCIs into a plurality of PCI groups, and may enable a PCI group to be assigned to a cell so that the assigned PCI group may be different from a PCI group assigned to a neighboring cell, and that an unassigned PCI in the assigned PCI group may be assigned to an HeNB within a single cell.

11 Claims, 7 Drawing Sheets

APPARATUS AND METHOD FOR ASSIGNING PCI OF HOME BASE STATION

CROSS-REFERENCE TO RELATED APPLICATION

This application claims the benefit of Korean Patent Application No. 10-2009-0075639, filed on Aug. 17, 2009, in the Korean Intellectual Property Office, the disclosure of which is incorporated herein by reference.

BACKGROUND

1. Field of the Invention

Embodiments of the present invention relate to an apparatus and method for assigning a Physical Cell Identity (PCI) of a Home eNodeB (HeNB), and more particularly, to an apparatus and method for assigning a PCI of an HeNB, to avoid a collision and confusion.

2. Description of the Related Art

A Physical Cell Identity (PCI) of a base station refers to a parameter required to form a wireless cell. The PCI may be used by a User Equipment (UE) to identify a cell, and may be set during an initial setting of the base station. Additionally, the PCI is a unique combination of a single orthogonal sequence and a single pseudorandom sequence, and a number of PCIs may be limited to 504. Accordingly, it is inevitable to reuse a PCI that is used in another cell.

A newly installed base station needs to select a PCI for its own cell. Here, the PCI may be assigned based on two conditions regarding collision avoidance and confusion avoidance.

Recently, a home base station such as a femtocell is being proposed. The femtocell is a kind of personal base station installed indoors to provide services to one to four subscribers. A home base station may be located within an area of a macro base station with a wide cell. In a big city with a dense population, a large number of home base stations exist in an area of a single macro base station. In the standard, to distinguish a home base station including a Closed Subscriber Group (CSG) cell from a macro base station, an area of a PCI for a home base station may be separated and the PCI may be assigned. Accordingly, a range of PCIs usable by a home base station may be inevitably further narrowed.

SUMMARY

An aspect of the present invention provides an apparatus and method for assigning a Physical Cell Identity (PCI) of a Home eNodeB (HeNB).

Another aspect of the present invention also provides an apparatus and method for assigning a PCI of an HeNB that may avoid a collision and confusion.

Still another aspect of the present invention also provides an apparatus and method for assigning a PCI group to an HeNB Gateway (HeNB GW) that requests an Operation, Administration, Maintenance (OAM) system to assign the PCI group, based on a geographical location of the HeNB GW, so that the PCI group assigned to the HeNB GW may differ from a PCI group assigned to a neighboring HeNB GW.

According to an aspect of the present invention, there is provided an apparatus for assigning a PCI in an OAM, the apparatus including: a communication unit to receive a request for a PCI group from an HeNB GW; and a PCI group assignment unit to check geographical information of the HeNB GW, to check information on a PCI group assigned to a neighboring HeNB GW neighboring the HeNB GW, and to assign another PCI group to the HeNB GW, the PCI group assigned to the HeNB GW being different from the PCI group assigned to the neighboring HeNB GW.

According to another aspect of the present invention, there is provided an apparatus for assigning a PCI in an HeNB GW, the apparatus including: a communication unit to receive a request for a PCI from an HeNB; and a PCI assignment unit to assign a PCI to the HeNB, the PCI being unassigned among PCIs contained in an assigned PCI group.

According to another aspect of the present invention, there is provided a method for assigning a PCI in an OAM, the method including: receiving a request for a PCI group from an HeNB GW; checking geographical information of the HeNB GW; checking information on a PCI group assigned to a neighboring HeNB GW neighboring the HeNB GW; and assigning another PCI group to the HeNB GW, the PCI group assigned to the HeNB GW being different from the PCI group assigned to the neighboring HeNB GW.

According to another aspect of the present invention, there is provided a method for assigning a PCI in an HeNB GW, the method including: receiving a request for a PCI from an HeNB; and assigning a PCI to the HeNB, the PCI being unassigned among PCIs contained in an assigned PCI group.

According to another aspect of the present invention, there is provided an apparatus for assigning a PCI of an HeNB, the apparatus including: an OAM to distribute allocable PCIs, to manage a plurality of PCI groups, and to assign a PCI group to an HeNB GW in response to a request for a PCI group, the assigned PCI group being different from a PCI group assigned to a neighboring HeNB GW; the HeNB GW to request the OAM to assign a PCI group, to receive the assigned PCI group from the OAM, and to assign a PCI to the HeNB in response to a request for the PCI, the PCI being unassigned among PCIs contained in the assigned PCI group; and the HeNB to request the HeNB GW to assign a PCI, and to receive the assigned PCI.

Effect

According to embodiments of the present invention, an apparatus for assigning a Physical Cell Identity (PCI) of a Home eNodeB (HeNB) may distribute PCIs into a plurality of PCI groups, and may enable different PCI groups to be assigned for each HeNB Gateway (HeNB GW), so that an unassigned PCI in an assigned PCI group may be assigned to an HeNB within a single cell. Thus, a PCI group assigned to an HeNB GW may be different from a PCI group assigned to a neighboring HeNB GW and accordingly, it is possible to avoid confusion. Additionally, since an unassigned PCI among PCIs in the PCI group may be assigned to an HeNB, a collision may be avoided.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
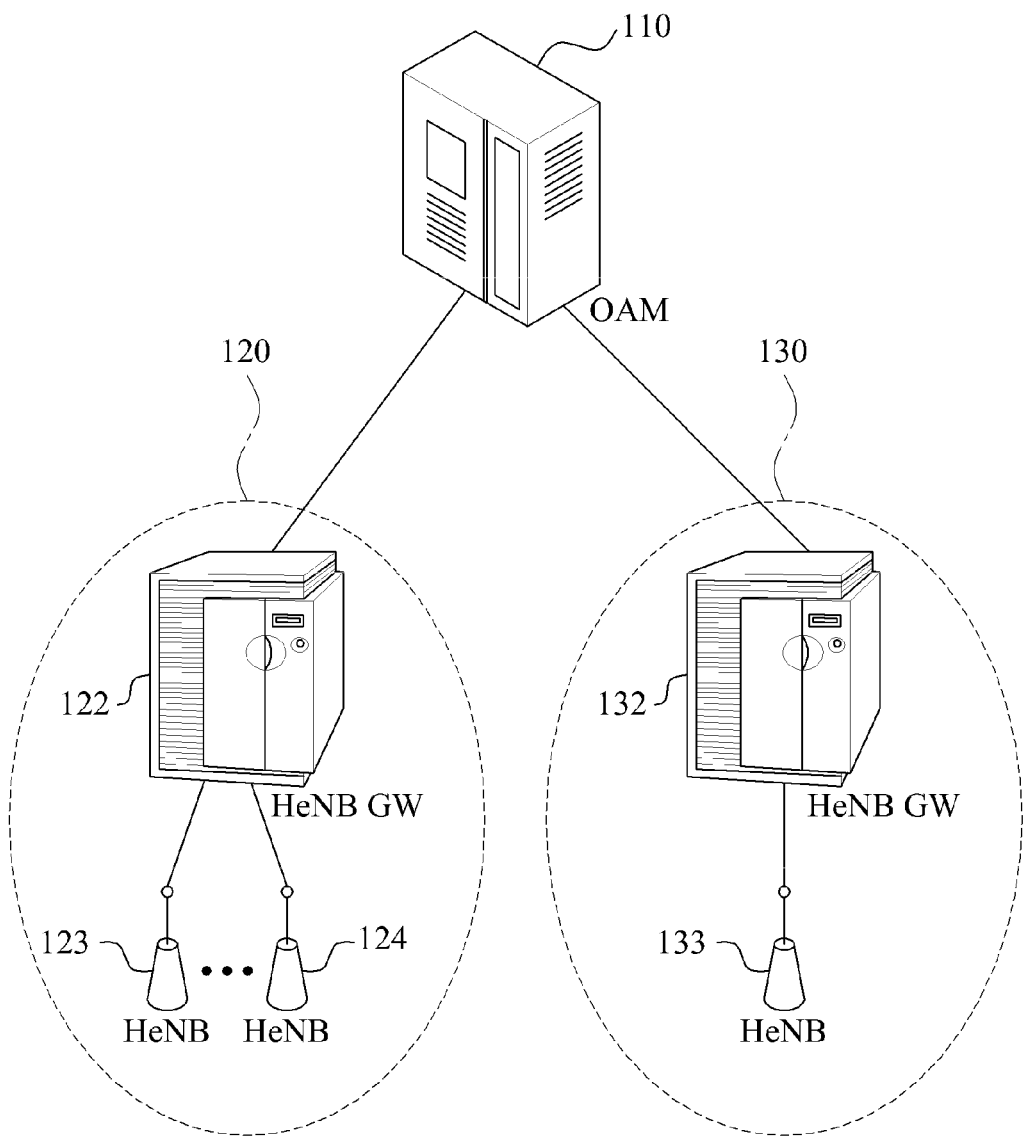
FIG. 1 is a diagram illustrating a wireless communication system having an apparatus for assigning a PCI of a Home eNodeB (HeNB) according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Embodiments of the present invention relate to an apparatus and method for assigning a Physical Cell Identity (PCI) of a Home eNodeB (HeNB), to prevent occurrence of a collision and confusion.

FIG. 1 is a diagram illustrating a wireless communication system having an apparatus for assigning a PCI of an HeNB according to an embodiment of the present invention.

Referring to FIG. 1, an Operation, Administration, Maintenance system (OAM) 110 may assign PCI groups to Home eNodeB Gateways (HeNB GWs) 122 and 132. Additionally, the HeNB GWs 122 and 132 may assign PCIs to HeNBs 123, 124, and 133. Here, the HeNBs 123 and 124 may be located in a coverage of the HeNB GW 120, and the HeNB 133 may be located in a coverage of the HeNB GW 130.

Figure 2:
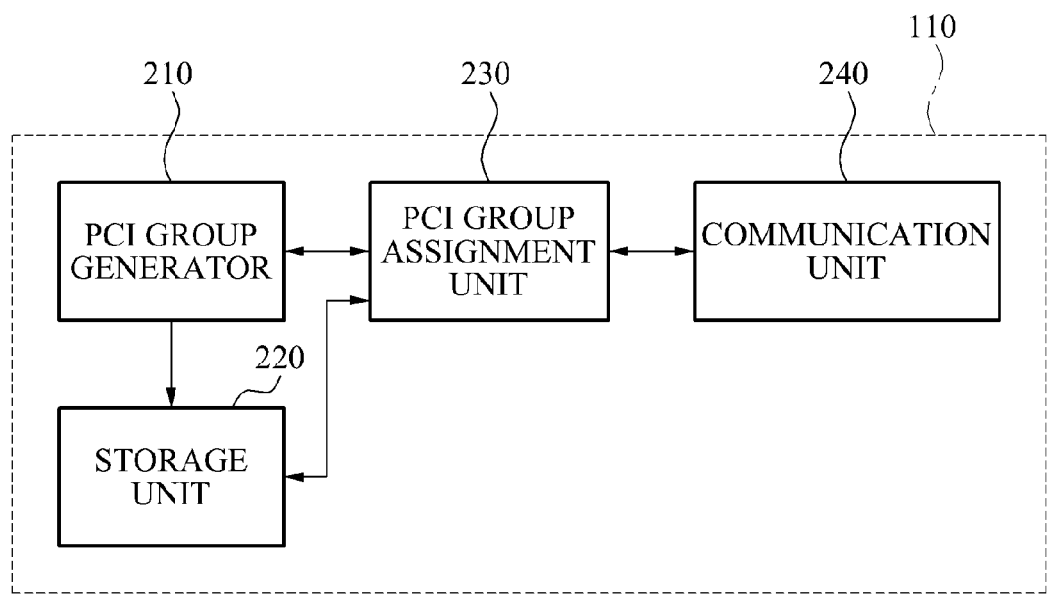
FIG. 2 is a block diagram illustrating a configuration of an OAM according to an embodiment of the present invention.

FIG. 2 is a block diagram illustrating a configuration of the OAM 110. Referring to FIG. 2, the OAM 110 may include a PCI group generator 210, a storage unit 220, a PCI group assignment unit 230, and a communication unit 240.

The PCI group generator 210 may distribute assignable PCIs, and may generate a plurality of PCI groups. Each of the plurality of PCI groups may include a plurality of PCIs, and the same PCI may be contained in only a single PCI group.

The storage unit 220 may store information on the generated PCI groups, geographical information of each HeNB GW, and information on PCI groups respectively assigned to HeNB GWs.

When a request for PCI groups is received from the HeNB GWs 122 and 132, the PCI group assignment unit 230 may search for information on a PCI group assigned to a neighboring HeNB GW from the storage unit 220, and may assign PCI groups to the HeNB GWs 122 and 132, so that the PCI groups may be different from the PCI group assigned to the neighboring HeNB GW. Since the PCI groups assigned to the HeNB GWs 122 and 132 differ from the PCI group assigned to the neighboring HeNB GW, confusion of PCIs may be avoided. In other words, confusion avoidance may mean that the same PCI may not be assigned to neighboring cells.

The communication unit 240 may provide a communication with an HeNB GW. Specifically, the communication unit 240 may receive a request for a PCI group from the HeNB GW, and may transmit the assigned PCI group to the HeNB GW.

Figure 3:
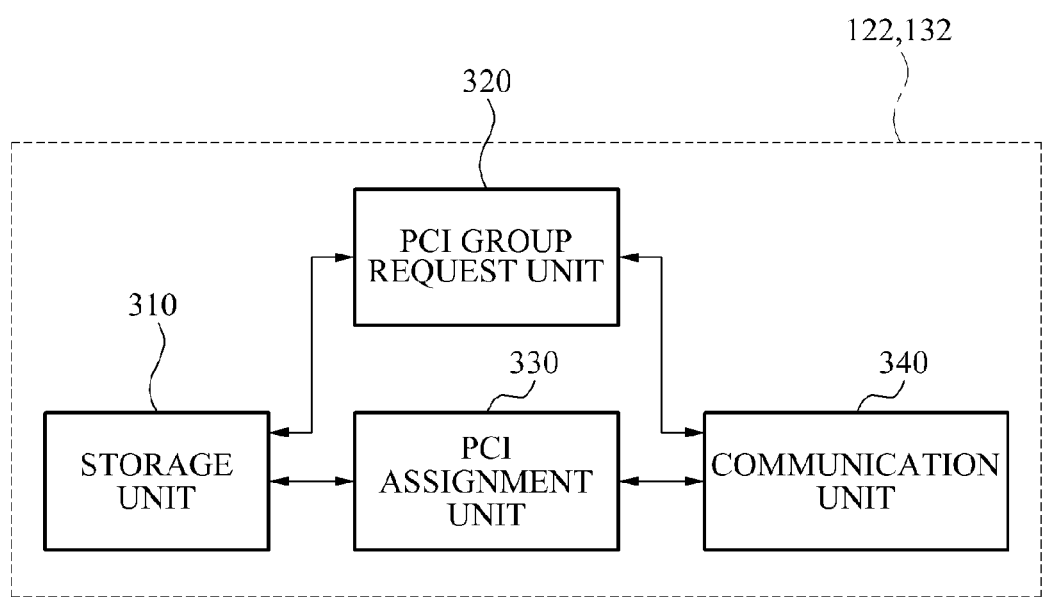
FIG. 3 is a block diagram illustrating a configuration of HeNB GWs according to an embodiment of the present invention.

FIG. 3 is a block diagram illustrating a configuration of HeNB GWs 122 and 132. Referring to FIG. 3, each of the HeNB GWs 122 and 132 may include a storage unit 310, a PCI group request unit 320, a PCI assignment unit 330, and a communication unit 340.

The PCI group request unit 320 may request the OAM 110 to assign a PCI group, during an initial setting of the HeNB GWs 122 and 132. When the PCI group is assigned by the OAM 110, the assigned PCI group may be stored in the storage unit 310.

The storage unit 310 may store a PCI group including a plurality of PCIs, HeNB information contained in the HeNB GWs 122 and 132, and information on a PCI assigned to an HeNB.

When a request for a PCI is received from an HeNB, the PCI assignment unit 330 may assign, to the HeNB, an unassigned PCI among the plurality of PCIs in the PCI group stored in the storage unit 310. Here, the PCI assignment unit 330 may not assign the same PCI to two or more HeNBs and accordingly, it is possible to prevent PCIs from colliding with each other.

Such a collision avoidance may indicate that a unique PCI may be assigned to a corresponding cell.

The communication unit 340 may provide a communication with an HeNB. Specifically, the communication unit 340 may receive a request for a PCI from the HeNB, and may transmit an assigned PCI to the HeNB.

Figure 4:
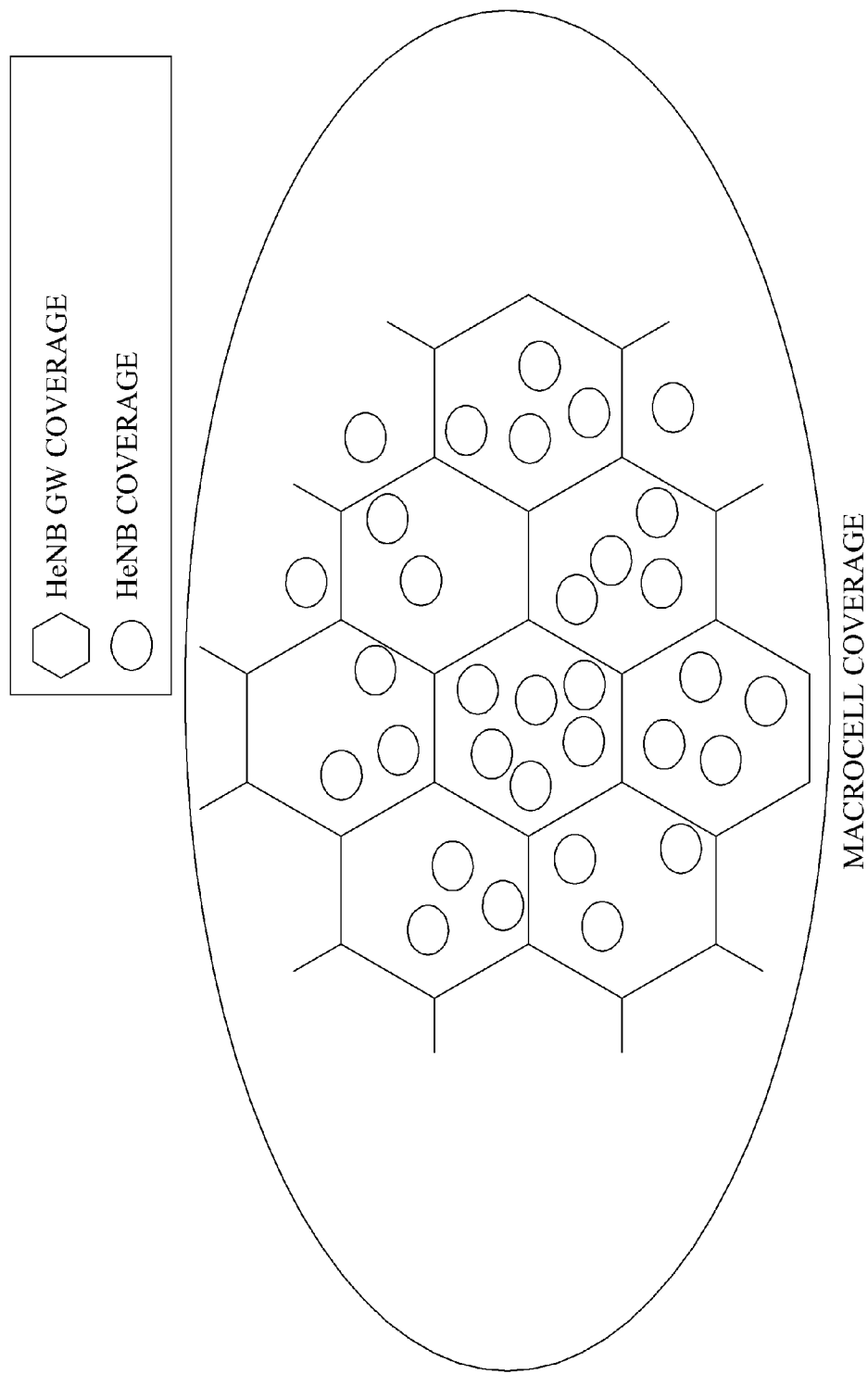
FIG. 4 is a diagram illustrating an example of a macrocell coverage, an HeNB coverage, and an HeNB GW coverage.

FIG. 4 is a diagram illustrating an example of a macrocell coverage, an HeNB coverage, and an HeNB GW coverage. Referring to FIG. 4, a plurality of hexagonal-shaped HeNB GW coverages overlap within the macrocell coverage having a wide radius, and a plurality of HeNB coverages overlap within each of the HeNB GW coverages.

Since the HeNB coverage overlaps within the HeNB GW coverage, it is important to avoid a collision and confusion.

Figure 5:
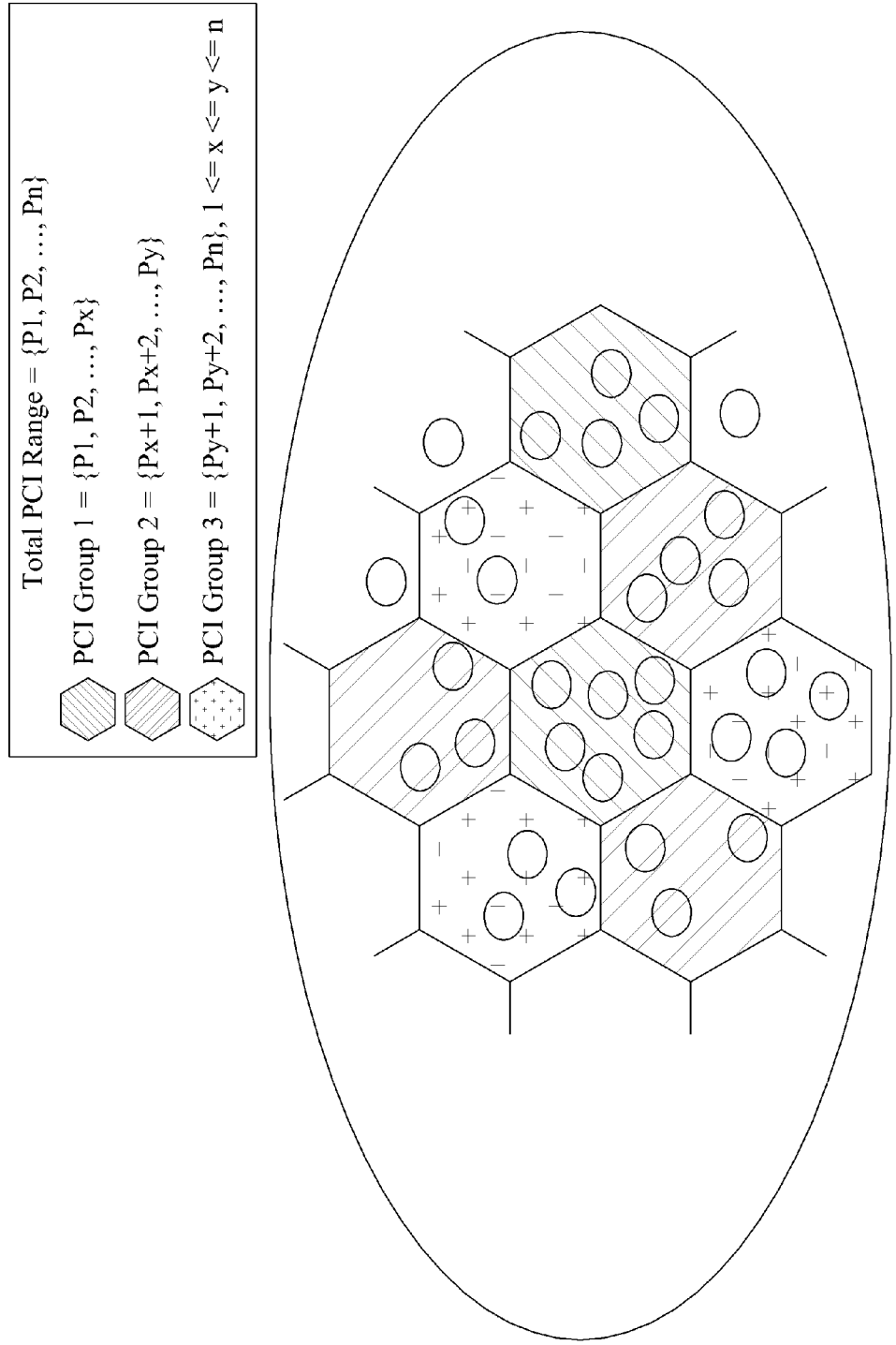
FIG. 5 is a diagram illustrating an example of a macrocell coverage, an HeNB coverage, and an HeNB GW coverage to which PCI groups are assigned.

FIG. 5 is a diagram illustrating an example of a macrocell coverage, an HeNB coverage, and an HeNB GW coverage to which PCI groups are assigned.

Referring to FIG. 5, an OAM may generate three PCI groups, each of which includes assignable PCIs, and may assign the PCI groups to the HeNBs with the coverage shown in FIG. 4. Here, the OAM may assign a PCI group to an HeNB GW based on geographical information of the HeNB GW, so that the PCI group assigned to the HeNB may differ from a PCI group assigned to a neighboring HeNB GW, to avoid confusion.

Hereinafter, a method of assigning a PCI of an HeNB according to an embodiment of the present invention will be described with reference to FIGS. 6 and 7.

Figure 6:
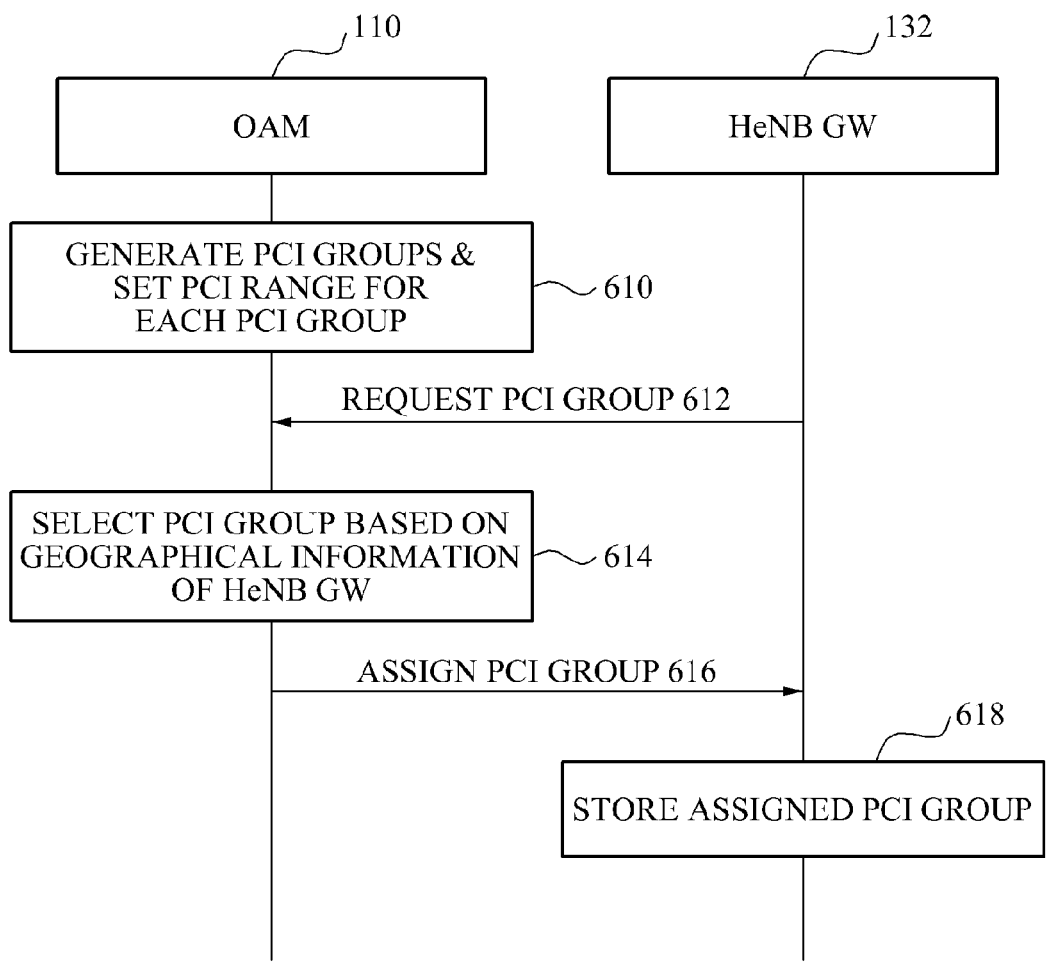
FIG. 6 is a flowchart illustrating an operation by which an OAM assigns a PCI group to an HeNB GW according to an embodiment of the present invention.

FIG. 6 is a flowchart illustrating an operation by which the OAM 110 assigns a PCI group to the HeNB GW 132.

Referring to FIG. 6, in operation 610, the OAM 110 may distribute assignable PCIs, and may generate a plurality of PCI groups. Each of the plurality of PCI groups may include a plurality of PCIs, and a PCI may be contained in only a single PCI group.

In operation 612, the OAM 110 may receive a request for a PCI group from the new HeNB GW 132.

In operation 614, in response to the request for the PCI group, the OAM 110 may check information on a PCI group assigned to a neighboring HeNB GW, based on geographical information of the HeNB GW 132, and may select another PCI group to assign the selected PCI to the HeNB GW 132. Here, the PCI group assigned to the HeNB GW 132 may differ from the PCI group assigned to the neighboring HeNB GW.

In operation 616, the OAM 110 may transmit the selected PCI group to the HeNB GW 132, so that the selected PCI group may be assigned to the HeNB GW 132.

In operation 618, the HeNB GW 132 may store the assigned PCI group.

Figure 7:
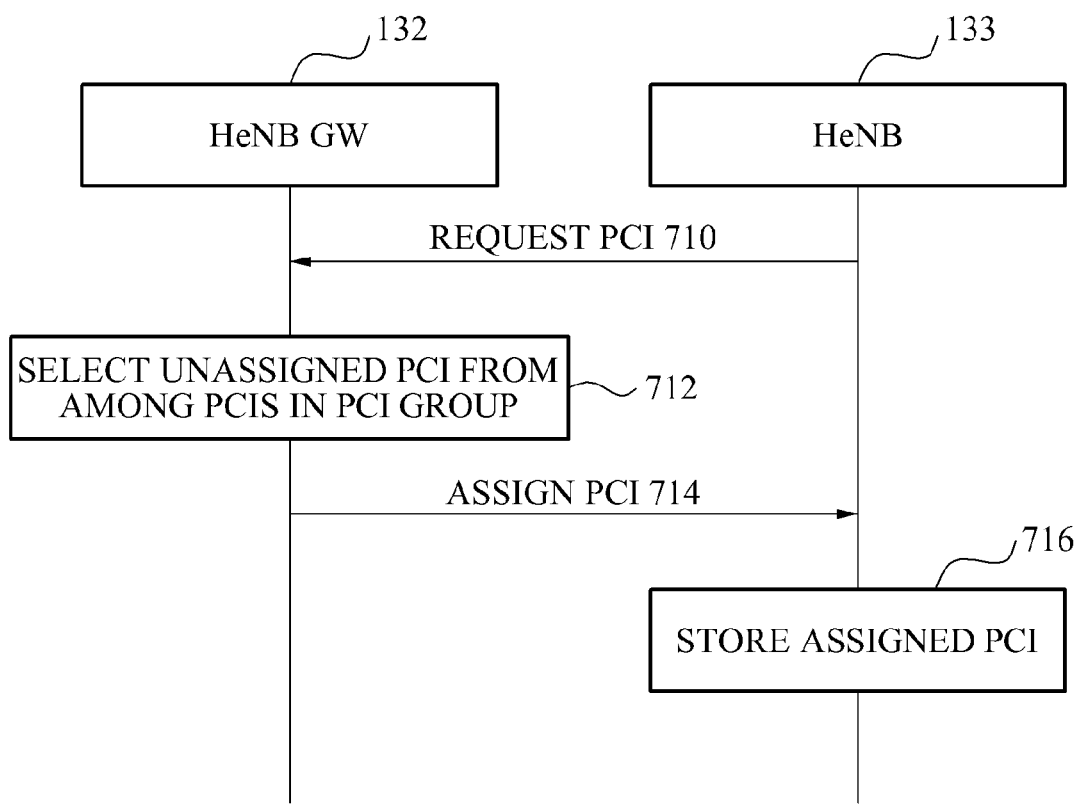
FIG. 7 is a flowchart illustrating an operation by which an HeNB GW assigns a PCI to an HeNB according to an embodiment of the present invention.

FIG. 7 is a flowchart illustrating an operation by which the HeNB GW 132 assigns a PCI to the HeNB 133.

Referring to FIG. 7, in operation 710, the HeNB 133 may transmit a request for a PCI to the HeNB GW 132.

In operation 712, in response to the request for the PCI, the HeNB GW 132 to which the PCI group is assigned may select an unassigned PCI from among PCIs contained in the assigned PCI group, to assign the selected PCI to the HeNB 133.

In operation 714, the HeNB GW 132 may transmit the assigned PCI to the HeNB 133, so that the selected PCI may be assigned to the HeNB 133.

In operation 716, the HeNB 133 may store the assigned PCI.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for assigning a Physical Cell Identity (PCI) in an Operation, Administration, Maintenance (OAM) system, the apparatus comprising:
   a communication unit to receive a request for a PCI group from a Home eNodeB Gateway (HeNB GW); and
   a PCI group assignment unit to check geographical information of the HeNB GW, to check information on a first PCI group assigned to a neighboring HeNB GW neighboring the HeNB GW, and to assign a unique second PCI group to the HeNB GW, the PCI group assigned to the HeNB GW being different from the PCI group assigned to the neighboring HeNB GW,
wherein an individual PCI from the second PCI group that is to be assigned by the HeNB GW to an HeNB is not contained in the first PCI group assigned to the neighboring HeNB GW as a result of the PCI group assignment from the OAM system to the HeNB GW of the unique second PCI group.

2. The apparatus of claim 1, further comprising:
   a PCI group generator to distribute assignable PCIs and to generate a plurality of PCI groups, each of the plurality of PCI groups comprising a plurality of assignable PCIs.

3. The apparatus of claim 1, further comprising:
   a storage unit to store PCI group information, geographical information of the neighboring HeNB GW, and the information on the first PCI group assigned to the neighboring HeNB GW.

4. An apparatus for assigning a PCI in an HeNB GW, the apparatus comprising:
   a communication unit to receive a request for a PCI from a Home eNodeB (HeNB); and
   a PCI assignment unit to assign a PCI to the HeNB, the PCI being unassigned among PCIs contained in an assigned PCI group,
wherein the PCI that is to be assigned by the HeNB GW to the HeNB is not contained in a PCI group assigned to a neighboring HeNB GW as a result of an original PCI group assignment from an Operation, Administration, Maintenance (OAM) system to the HeNB GW of a unique PCI group.

5. The apparatus of claim 4, further comprising:
   a PCI group request unit to request an OAM to assign a PCI group, and to receive the assigned PCI group from the OAM, the assigned PCI group being different from a PCI group assigned to a neighboring HeNB GW.

6. The apparatus of claim 4, further comprising:
   a storage unit to store the assigned PCI group, and information on an assigned PCI among PCIs contained in the assigned PCI group.

7. A method for assigning a PCI in an Operation, Administration, Maintenance (OAM) system, the method comprising:
   receiving a request for a PCI group from an HeNB GW;
   checking geographical information of the HeNB GW;
   checking information on a first PCI group assigned to a neighboring HeNB GW neighboring the HeNB GW; and
   assigning a unique second PCI group to the HeNB GW, the PCI group assigned to the HeNB GW being different from the PCI group assigned to the neighboring HeNB GW, wherein an individual PCI from the second PCI group that is to be assigned by the HeNB GW to an HeNB is not contained in the first PCI group assigned to the neighboring HeNB GW as a result of the PCI group assignment from the OAM system to the HeNB GW of the unique second PCI group.

8. The method of claim 7, further comprising:
   distributing allocable PCIs and generating a plurality of PCI groups, each of the plurality of PCI groups comprising a plurality of assignable PCIs.

9. A method for assigning a PCI in an HeNB GW, the method comprising:
   receiving a request for a PCI from an HeNB; and
   assigning a PCI to the HeNB, the PCI being unassigned among PCIs contained in an assigned PCI group,
wherein the PCI that is to be assigned by the HeNB GW to the HeNB is not contained in a PCI group assigned to a neighboring HeNB GW as a result of an original PCI group assignment from an Operation, Administration, Maintenance (OAM) system to the HeNB GW of a unique PCI group.

10. The method of claim 9, further comprising:
    requesting an OAM to assign a PCI group; and
    receiving the assigned PCI group from the OAM, the assigned PCI group being different from a PCI group assigned to the neighboring HeNB GW.

11. An apparatus for assigning a PCI of an HeNB, the apparatus comprising:
    an Operation, Administration, Maintenance (OAM) system to distribute allocable PCIs, to manage a plurality of PCI groups, and to assign a unique PCI group to an HeNB GW in response to a request for the PCI group, the assigned PCI group being different from a PCI group assigned to a neighboring HeNB GW;

the HeNB GW to request the OAM to assign a PCI group, to receive the assigned PCI group from the OAM, and to assign a PCI to the HeNB in response to a request for the PCI, the PCI being unassigned among PCIs contained in the assigned PCI group, wherein the PCI that is to be assigned by the HeNB GW to the HeNB is not contained in a PCI group assigned to a neighboring HeNB GW as a result of the original PCI group assignment from the OAM to the HeNB GW of the unique PCI group; and the HeNB to request the HeNB GW to assign a PCI, and to receive the assigned PCI.

\* \* \* \* \*